3,397,190
POLYMERS OF CARBONAMIDES CONTAINING
SULFONAMIDE GROUPS
Rosemarie Toepfl, Basel, and Arthur Maeder, Therwil,
Switzerland, assignors to Ciba Limited, Basel, Switzerland, a Swiss company
No Drawing. Filed May 16, 1966, Ser. No. 550,147
Claims priority, application Switzerland, May 17, 1965,
6,839/65
10 Claims. (Cl. 260—79.3)

ABSTRACT OF THE DISCLOSURE

New polymerization products are provided which are obtained by polymerizing 5–100% of the compound of the general formula

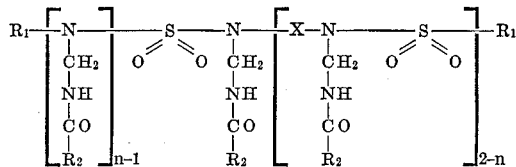

where $n=1$ or 2, $R_1$ represents an alkyl, aryl, alkaryl or aralkyl radical, or when $n=2$ a hydrogen atom, $R_2$ represents an ethylenically unsaturated residue containing at most 3 carbon atoms, and X represents an alkylene or arylene radical, with 95–0% of another copolymerizable ethylenically unsaturated monomeric compound.

The polymerization product of this invention may be used to prepare shaped objects, coatings on nonporous materials and binders, and are especially useful for impregnating or coating porous materials such as textiles, paper and leather.

The present invention provides new polymers of carbonamides, containing sulphonamide groups, of $\alpha,\beta$-ethylenically unsaturated aliphatic carboxylic acids of the general formula (1)
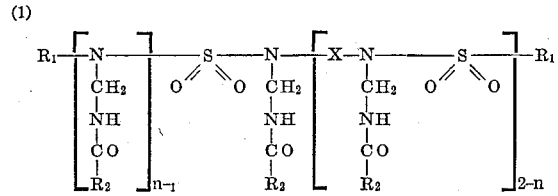

where $n=1$ or 2, $R_1$ represents an alkyl, aryl, alkaryl or aralkyl radical, or when $n=2$ a hydrogen atom, $R_2$ represents an ethylenically unsaturated residue containing at most 3 carbon atoms, and X represents an alkylene or arylene radical. When $n=2$, the products concerned are polymerizable compounds of the formula (2)
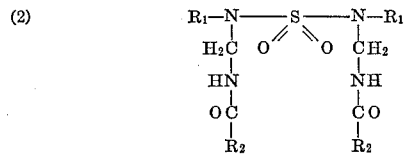

where $R_1$ represents an alkyl, aryl, alkaryl or aralkyl radical or a hydrogen atom, and $R_2$ represents an ethylenically unsaturated residue containing up to 3 carbon atoms.

Among these products there are valuable, for example, polymerizable compounds of the formula (3)
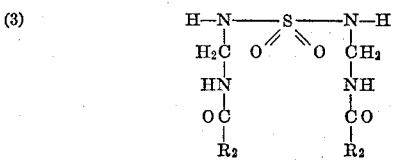

where $R_2$ represents an ethylenically unsaturated residue containing up to 3 carbon atoms. When in the Formula 1, $n=1$, the products are polymerizable compounds of the formula (4)
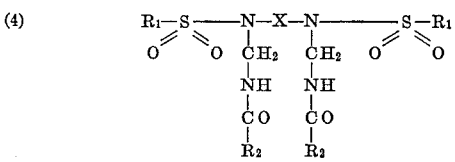

where $R_1$ represents an alkyl, aryl, alkaryl or aralkyl radical, $R_2$ an ethylenically unsaturated residue containing up to 3 carbon atoms and X an alkylene or arylene radical.

Among them there are preferred, for example, compounds of the formula (5)
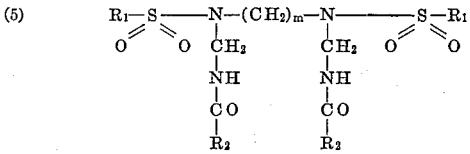

where $R_1$ represents an alkyl or benzene radical, $R_2$ an ethylenically unsaturated residue containing up to 3 carbon atoms and $m$ is a whole number from 1 to 8.

In all cases represented by the Formulae 1 to 5 polymerizable compounds, in which $R_2$ represents an

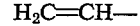

residue, have proved particularly valuable. Further valuable are compounds in which the residue $R_2$—CO— is derived from methacrylic, crotonic or vinylacetic acid.

The compounds of the Formula 1 are obtained when a sulphonamide of the formula (6)
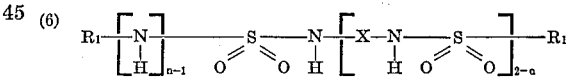

where $n=1$ or 2, $R_1$ represents an alkyl, aryl, alkaryl or aralkyl radical or, when $n=2$, a hydrogen atom, and X represents an alkylene or arylene radical—is condensed in the molecular ratio of 1:2 with an ethylenically unsaturated compound of the formula (7)     Z—O—CH$_2$—NH—CO—R$_2$ where Z stands for an alkyl radical containing 1 to 3 carbon atoms or a hydrogen atom and $R_2$ represents an ethylenically unsaturated residue containing up to 3 carbon atoms, accompanied by elimination of H—O—Z.

The condensation referred to is advantageously carried out in an organic solvent, such as benzene or acetone, at a temperature from 20 to 100° C., preferably from 40 to 80° C.

The monomeric compounds of the Formulae 1 to 5 can be polymeriped with other polymerizable compounds to form cross-linked copolymers in solution, in emulsion or suspension and in the presence of a catalyst that gives off free radicals or of an ionic catalyst. As examples of monomers suitable for use in the manufacture of such copolymers there may be mentioned:

(a) Vinyl esters of organic acids, for example vinyl acetate, vinyl formate, vinyl butyrate and vinyl benzoate, (b) Vinylalkylketones such as vinylmethylketone, (c) Vinylhalides such as vinylchloride, vinylfluoride and vinylidenechloride, (d) Vinylaryl compounds such as styrene and substituted styrenes, such as α-methylstyrene, (e) Derivatives of the acrylic acid series such as acrylonitrile or acrylamide or methacrylamide and preferably the N-monosubstituted or N,N-disubstituted derivatives, such as N,N-dihydroxyethyl-acrylamide, N,N-diethyl-acrylamide, N-tertiary butyl-acrylamide and N-cyclohexyl-acrylamide. Furthermore N-methylol-acrylamide and N-methylol-methacrylamide and the corresponding alkyl ethers. Further suitable are basic amides such as diethylaminopropyl-acrylamide and its quaternated products, (f) Especially esters of the crylic acid series, such as esters from acrylic, methacrylic, α-chloroacrylic, crotonic, maleic, fumaric or itaconic acid and mono- or di-alcohols containing 1 to 18 carbon atoms, or phenols, for example ethyl acrylate, glycidyl acrylate, butyl acrylate, acrylic acid monoglycol ester or dodecyl acrylate, and furthermore (g) Free, aliphatic, unsaturated monocarboxylic or di-carboxylic acids such as acrylic, methacrylic, crotonic, itaconic, maleic or fumaric acid.

Furthermore, there may be used polymerizable olefines such as isobutylene, butadiene or 2-chlorobutadiene.

Preferred use is made of vinylchloride, vinylidene-chloride, acrylic acid, methacrylic acid, the salts of acrylic acid, methacrylic acid, fumaric and itaconic acid, such as calcium acrylate, as well as the esters of these acids such as ethyl acrylate, butyl acrylate, acrylic acid glycidal ester, acrylic acid monoglycol ester, furthermore acrylamide, methacrylamide, N-methylol-acrylamide, N-methylol-acrylamide methyl ether, N-tertiary butyl-acrylamide, vinyl acetate, acrylonitrile, styrene and butadiene. Particularly valuable multi-polymers are obtained by polymerizing (1) compounds of the Formula 1 with
(2) acrylonitrile, vinylidenechloride, vinyl acetate, styrene or diethylaminopropyl-acrylamide and with
(3) an ester of the acrylic acid series.

As a rule the polymers consist of 5 to 100% of a compound of the general Formula 1 and of 95 to 0% of another compound. Depending on the selected polymerization conditions the polymers are obtained as liquids, gels, emulsions or granulates.

The polymers may be used as such, in solution or in emulsion. They lend themselves to the manufacture of shaped objects, of coatings on non-porous materials such as metals, glass or wood, of binders, especially for pigments, or especially for the production of impregnations or coatings on porous materials such as textiles, paper or above all leather. If desired, the polymers may be used in combination with other polymers or precondensates, such as epoxides, aminoplasts, for example condensates from formaldehyde and urea, cyanamide, dicyandiamide or especially melamine. For conversion into the insoluble state the polymers are advantageously heated to a temperature from 100 to 180° C.

Parts and percentages in the following manufacturing instructions and examples are by weight.

Manufacturing Instruction A

A mixture of 101 parts of N-methylol-acrylamide (1 mol), 48 parts of sulphamide (HN$_2$—SO$_2$—NH$_2$; ½ mol), 0.3 part of phenothiazine and 0.5 part of para-toluenesulphonic acid in 200 parts of acetone is reacted at 60° C. The reaction product of the formula

is obtained by removing the acetone. It forms a water-soluble, white powder, melting at 153° to 155° C.

Analysis.—Calculated: C, 36.6%; H, 5.38%; N, 21.36%. Found: C, 36.1%; H, 5.4%; N, 21.3%.

Manufacturing Instruction B

A mixture of 37.4 parts of N-methylol-acrylamide (0.37 mol), 40 parts of ethylene-bismethanesulphonamide (0.185 mol), 0.2 part of phenothiazine and 0.5 parts of paratoluene-sulphonic acid in 250 parts of acetone is reacted at 50° C. The reaction product of the formula

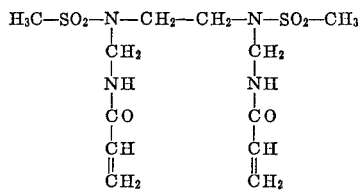

is obtained by removing the acetone. It forms a crystal magma which is recrystallized from acetonitrile. It melts at 158° to 160° C. Yield: 82% of the theoretical.

Analysis.—Calculated: C, 37.68%; H, 5.8%; N, 14.65%; S, 16.77%. Found: C, 37.7%; H, 6.0%; N, 14.3%; S, 16.6%.

Manufacturing Instruction C

A mixture of 20.2 parts of N-methylol-acrylamide (0.2 mol), 42.5 parts of hexamethylene-bis-para-toluenesulphonamide (0.1 mol), 0.5 part of phenothiazine and 0.5 part of para-toluenesulphonic acid in 250 parts of benzene is reacted at the boil. The water formed is removed azeotropically. On removal of the benzene a crystal magma is obtained which consists predominantly of the compound of the formula

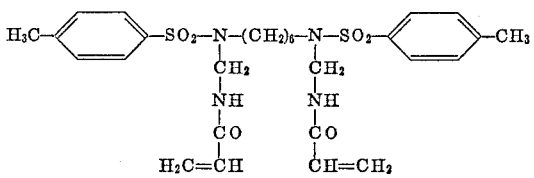

which is recrystallized from ethyl acetate. Melting point: 152° to 153° C. Yield: 81.5% of the theoretical.

Analysis.—Calculated: C, 56.93%; H, 6.48%; N, 9.48%. Found: C, 56.64%; H, 6.52%; N, 9.24%.

Manufacturing Instruction D

A mixture of 57.8 parts of N-methylol-acrylamide (0.572 mol), 97 parts of ethylene-bis-benzenesulphonamide (0.286 mol), 0.5 part of phenothiazine and 0.5 part of paratoluenesulphonic acid in 200 parts of benzene is reacted at the boil. The reaction product of the formula

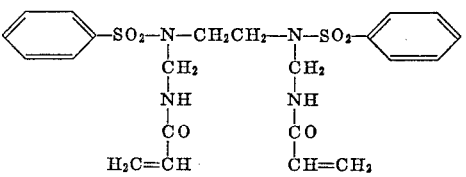

precipitates, is suctioned off and recrystallized from ethanol.

Analysis.—Calculated: C, 52.16%; H, 5.17%; N, 11.06%; S, 12.55%. Found: C, 52.4%; H, 5.4%; N, 11.5%; S, 12.3%.

EXAMPLE 1

A pre-emulsion is prepared by thoroughly agitating together 117 parts of isobutylacrylate, 22.5 parts of acrylonitrile, 7.5 parts of a condensation product from N-methylolacrylamide and sulphamide (prepared according to Manufacturing Instruction A), 3 parts of acrylic acid, 8.75 parts of sodium petroleum-sulphonate ($C_{26}H_{42}SO_3Na$), 3 parts of heptadecanol, 0.6 part of triethanolamine and 137.65 parts of water. 75 parts of this pre-emulsion are diluted with 76.3 parts of water and heated to an internal temperature of 55° C. in a stirring flask scavenged with nitrogen. A solution of 0.3 part of sodium bisulphite in 1.7 parts of water, and 0.5 part of a potassium persulphate solution of 3.3% strength are added, whereupon the temperature rises. The remaining 225 g. of the pre-emulsion (to which 5.5 parts of a potassium persulphate solution of 3.3% strength have been added) are then dropped in within 55 minutes. After the dropwise addition 3 more portions of 5 parts each of a potassium persulphate solution of 3.3% strength are added after intervals of 30 minutes each time, and the batch is polymerized for another 2 hours, to yield a thinly liquid, pure emulsion having a polymer content of 38.8% (theory: 40.6%).

EXAMPLE 2

A pre-emulsion is prepared by thoroughly agitating together 93 parts of n-butylacrylate, 5 parts of a condensate from N-methylolacrylamide and sulphamide (prepared according to Manufacturing Instruction A), 2 parts of acrylic acid, 2.5 parts of sodium laurylsulphate, 2.5 parts of triethanolamine and 140 parts of water. One half of this pre-emulsion is introduced into a stirring flask scavenged with nitrogen and heated to an internal temperature of 62° C. A solution of 0.2 part of sodium bisulphite in 2 parts of water, and a solution of 0.025 part of potassium persulphate in 0.75 part of water are added, whereupon the temperature rises, and the remaining half of the pre-emulsion is then dropped in within 15 minutes. Separately but simultaneously a solution of 0.475 part of potassium persulphate in 14.25 parts of water is dropped in. The batch is then polymerized for another 2 hours, to furnish a thinly liquid, pure emulsion having a polymer content of 40.5% (theory: 40.5%).

EXAMPLE 3

A pre-emulsion is prepared by thoroughly agitating together 117 parts of isobutylacrylate, 22.5 parts of acrylonitrile, 7.5 parts of a condensation product from N - methylol - acrylamide and ethylene-bis-methanesulphonamide (prepared according to Manufacturing Instruction B), 3 parts of acrylic acid, 8.75 parts of sodium petroleum-sulphonate ($C_{26}H_{42}SO_3Na$), 3 parts of heptadecanol, 0.6 part of triethanolamine and 137.65 parts of water. 75 parts of this pre-emulsion are diluted with 76.3 parts of water and heated to an internal temperature of 57° C. in a stirring flask scavenged with nitrogen. A solution of 0.3 part of sodium bisulphite in 1.7 parts of water, and 0.5 part of a potassium persulphate solution of 3.3% strength are added, whereupon the temperature rises, and then the remaining 225 parts of the pre-emulsion (to which 5.5 parts of a potassium persulphate solution of 3.3% strength have been added) are dropped in within 35 minutes. At intervals of 30 minutes each 3 further additions of 5 parts of potassium persulphate solution of 3.3% strength are made and the batch is polymerized further for 3 hours, the furnish a thinly liquid, pure emulsion having a polymer content of 39.3% (theory: 40.6%).

EXAMPLE 4

A pre-emulsion is prepared by thoroughly agitating together 267 parts of vinylidenechloride, 30 parts of methylacrylate, 3 parts of a condensation product from N-methylolacrylamide and ethylene - bis - methanesulphonamide (prepared according to Manufacturing Instruction B), 3 parts of sodium dinaphthyl-methanedisulphonate, 1.5 parts of sodium laurylsulphate, 3.6 parts of hydrogen peroxide and 162 parts of water. This pre-emulsion is introduced in a stirring flask scavenged with nitrogen, and at 19° C. a solution of 0.35 part of ascorbic acid in 13.5 parts of water, and 1.12 parts of a strongly diluted ferroammonium sulphate solution [0.001 part of $Fe(NH_4)_2 \cdot (SO_4)_2 \cdot 6H_2C$] are added, whereupon the temperature rises.

After one hour this addition of catalyst is repeated, and the viscous emulsion is diluted with 55 parts of water. 30 minutes after the second catalyst addition the emulsion is heated to 60° C. and polymerized for another hour, to furnish a medium viscous, pure emulsion having a polymer content of 54.9% (theory: 54.9%).

EXAMPLE 5

A pre-emulsion is prepared by thoroughly agitating together 96 parts of n-butylacrylate, 4 parts of a condensation product from N-methylol-acrylamide and hexamethylene - bis - paratoluenesulphonamide (prepared according to Manufacturing Instruction C), 2 parts of sodium laurylsulphate, 2 parts of sodium α-hydroxyoctadecanesulphonate, 0.5 part of triethanolamine and 136 parts of water. One half of this pre-emulsion is introduced in a stirring flask scavenged with nitrogen and heated to an internal temperature of 64° C. A solution of 0.2 part of sodium bisulphite in 2 parts of water, and 0.05 part of potassium persulphate are added, whereupon the temperature rises. The other half of the pre-emulsion is then dropped in within 15 minutes. Separately, a solution of 0.45 part of potassium persulphate in 13.5 parts of water is dropped in. The batch is then further polymerized for 4 hours, to furnish a thinly liquid, pure emulsion having a polymer content of 37% (theory: 40.7%). Films cast from this emulsion and dried in air are soluble in cold trichloroethylene; after having been hardened for 5 minutes at 160° C. to 165° C. they have become insoluble in boiling trichloroethylene.

EXAMPLE 6

A pre-emulsion is prepared by thoroughly agitating together 45 parts of vinylacetate, 45 parts of n-butylacrylate, 5 parts of a condensation product from N-methylolacrylamide and sulphamide (prepared according to Manufacturing Instruction A), 5 parts of diethylaminopropyl-acrylamide quaternated with dimethylsulphate, 5 parts of lauroylamidopropyl-trimethylammonium methosulphate, 2 parts of an adduct from 9 mols of ethylene oxide with 1 mol of nonylphenol, 1 part of triethanolamine and 235 parts of water. One half of this pre-emulsion is introduced into a reactor equipped with reflux condenser, nitrogen inlet, thermometer and agitator, which has previously been scavenged with nitrogen, and the batch is cooled to an internal temperature of 18° C. 1.2 parts of hydrogen peroxide of 35% strength are then added to the pre-emulsion in the reaction vessel. On addition of 1.2 parts of hydrogen peroxide of 35% strength, 0.096 part of ascorbic acid dissolved in 1.6 parts of water, and 1.6 parts of a strongly diluted solution of ferroammonium sulphate [0.00025 part of

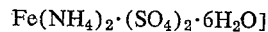

$Fe(NH_4)_2 \cdot (SO_4)_2 \cdot 6H_2O$]

to the pre-emulsion in the reactor the temperature rises, and within one hour the remainder of the pre-emulsion is dropped in. Separately but simultaneously, a solution of 0.384 part of ascorbic acid in 6.4 parts of water, and 6.4 parts of a strongly diluted ferroammonium sulphate solution [0.0018 part of $Fe(NH_4)_2 \cdot (SO_4)_2 \cdot 6H_2O$] are dropped in. The batch is then polymerized for another 5 hours, to furnish a thinly liquid, finely dispersed emulsion having a polymer content of 28.0% (theory: 30.0%). Films cast from this emulsion and dried in air are soluble in boiling trichloroethylene. By using as curing catalyst magnesium chloride and hardening the film for 5 minutes at 130° C., it becomes insoluble in boiling trichloroethylene.

EXAMPLE 7

A pre-emulsion is prepared by thoroughly agitating together 60 parts of styrene, 37 parts of n-butylacrylate, 3 parts of a condensation product from N-methylol-acrylamide and ethylene-bis-benzenesulphonamide (prepared according to Manufacturing Instruction D), 5.0 parts of sodium laurylsulphate, 0.5 part of triethanolamine and 145 parts of water. One half of this pre-emulsion is introduced into a reactor equipped with reflux condenser, nitrogen inlet, thermometer and agitator, which has previously been scavenged with nitrogen, and cooled to an internal temperature of 18° C. 1.2 parts of hydrogen peroxide of 35% strength are then added to the pre-emulsion in the reactor. After addition of 1.2 parts of hydrogen peroxide of 35% strength, a solution of 0.096 part of ascorbic acid in 1.6 parts of water, and 1.6 parts of a strongly diluted ferroammonium sulphate solution [0.00025 part of $Fe(NH_4)_2 \cdot (SO_4)_2 \cdot 6H_2O$] are added to the pre-emulsion in the flask, the temperature rises, whereupon within 30 minutes the remainder of the pre-emulsion is dropped in. Separately but simultaneously, a solution of 0.384 part of ascorbic acid in 6.4 parts of water and 6.4 parts of a strongly diluted ferroammonium sulphate solution [0.0018 part of $Fe(NH_4)_2 \cdot (SO_4)_2 \cdot 6H_2O$] are dropped in, and the batch is polymerized for another 3 hours, to furnish a thinly liquid, pure emulsion having a polymer content of 38.8% (theory: 38.8%). Films cast from this emulsion and dried in air are soluble in boiling trichloroethylene. By using as curing catalyst magnesium chloride and hardening for 10 minutes at 130° C. a film is obtained that is insoluble in boiling trichloroethylene.

EXAMPLE 8

A pre-emulsion is prepared by thoroughly agitating together 75 parts of n-butylacrylate, 17 parts of acrylonitrile, 6 parts of a condensation product from N-methylolacrylamide and ethylene-bis-benzenesulphonamide (prepared according to Manufacturing Instruction D), 5 parts of acrylic acid, 2.5 parts of sodium laurylsulphate, 3.5 parts of a sulphonated fat, 1 part of triethanolamine, 1 part of isooctanol and 112 parts of water. One half of this pre-emulsion is introduced into a flask scavenged with nitrogen and equipped with reflux condenser, nitrogen inlet, thermometer and agitator, and cooled to an internal temperature of 18° C. Then 1.2 parts of hydrogen peroxide of 35% strength are added to the pre-emulsion in the reactor. After addition of 1.2 parts of hydrogen peroxide of 35% strength, a solution of 0.096 part of ascorbic acid in 1.6 parts of water and 1.6 parts of a strongly diluted ferroammonium sulphate solution [0.00025 part of $Fe(NH_4)_2 \cdot (SO_4)_2 \cdot 6H_2O$] to the pre-emulsion in the flask the temperature rises, and within one hour the remainder of the pre-emulsion is dropped in. Separately but simultaneously, a solution of 0.384 part of ascorbic acid in 6.4 parts of water, and 6.4 parts of a strongly diluted ferroammonium sulphate solution [0.0018 part of $Fe(NH_4)_2 \cdot (SO_4)_2 \cdot 6H_2O$] are dropped in, and the batch is polymerized for another 3 hours, to furnish a thinly liquid, pure emulsion having a polymer content of 45% (theory: 44.6%). Polymer yield: 98.4%. Films cast from this emulsion and dried at room temperature are soluble in boiling trichloroethylene; after having been hardened for 10 minutes at 130° C. they become completely insoluble in boiling trichloroethylene.

EXAMPLE 9

A solution of 36 parts of vinylacetate, 11.5 parts of n-butylacrylate, 5 parts of a condensation product from N-methylol - acrylamide and ethylene - bis -benzenesulphonamide [prepared according to Manufacturing Instruction D] in 118 parts of ethyl acetate is heated to an internal temperature of 60° C. in a flask scavenged with nitrogen, equipped with reflux condenser, nitrogen inlet, thermometer and agitator. On addition of 0.2 part of benzoyl peroxide the temperature rises, whereupon a solution of 36 parts of n-butylacrylate, 11.5 parts of vinylacetate in 118 parts of ethyl acetate is dropped in within 30 minutes. During the dropwise addition 2×0.2 part of benzoyl peroxide are added and the addition of 0.2 part of benzoyl peroxide each is repeated twice more after intervals of 30 minutes each after completion of the dropwise addition. The batch is then polymerized for another 7 hours, to yield a medium viscous, clear resin solution having a polymer content of 28.5% (theory: 30.0%). Films cast from this resin solution and dried in air are soluble in trichloroethylene. On addition of zinc fluorborate and hardening for 10 minutes at 160° C. a film is obtained which is insoluble in trichloroethylene.

EXAMPLE 10

A cotton fabric is dressed and padded in the following manner:

120 g./litre of an aqueous solution of 50% strength of methylolmelamine methyl ether and dimethylol-ethylenurea dimethyl ether, 30 g./litre of a polyethylene emulsion of 20% strength, 50 g./litre of an aqueous emulsion containing 40.5% of the copolymer of Example 2 from 93 parts of n-butylacrylate,
5 parts of a condensation product from N-methylol acrylamide and sulphamide and
2 parts of acrylic acid,
3 g./litre of ammonium nitrate, citric acid up to pH 5.5.

The cotton fabric is expressed to a weight increase of 60%, dried at 80° C., hardened for 4½ minutes at 150 to 160° C., rinsed for 5 minutes in cold water, and further washed for 10 minutes at 40° C. with 3 g./litre of sodium metaphosphate and 1 g./litre of a condensation product from para-nonylphenol with 9 mols of ethylene oxide. The fabric dressed in this manner is much more crease-resistant than the untreated fabric. Fabric dressed in this manner is washed 5 times for 30 minutes each time in a solution containing, per litre, 5 g. of soap and 2 g. of soda. The fabric samples treated in this manner have suffered hardly any impairment of their crease-resistance.

EXAMPLE 11

A box side that has been twice fluffed with paper No. 400, after-tanned and pre-dyed, is treated with the following covering dye preparation:

100 parts of a covering dye consisting of
  50% of iron oxide
  20% of a styrene/acrylic acid 60/40 copolymer
  10% of a paraffin oil emulsion consisting of
    50% of paraffin oil
    7.5% of an emulsifier from hydroabietyl alcohol and
    200 mols of ethylene oxide, cross-linked with hexamethylene diisocyanate,
    42.5% of water
  1% of an emulsifier from hydroabietyl alcohol and 200 mols of ethylene oxide, cross-linked with hexamethylene diisocyanate,
  19% of water
150 parts of an aqueous emulsion containing 38.8% of the copolymer of Example 1, from 78 parts of isobutylacrylate,
15 parts of acrylonitrile, 5 parts of a condensation product from N-methylol-acrylamide and sulphamide,
2 parts of acrylic acid,
350 parts of water.

The leather is twice plush-wheeled with the above preparation, dried, ironed on a hydraulic press at 70° C. under 150 atmospheres (gauge) pressure, and the identical covering dye preparation is applied to it with the aid of four crosswise passages of a spraygun.

The leather dressed in this manner may be ironed at 200° C. The stability of the edges to ironing at 200° C. is likewise good.

What is claimed is:
1. New addition polymerization products obtained in the presence of a catalyst selected from the group consisting of catalysts which give off free radicals and ionic catalysts from
(a) amides, containing sulphonamide groups, of $\alpha,\beta$-ethylenically unsaturated, aliphatic carboxylic acids of the formula

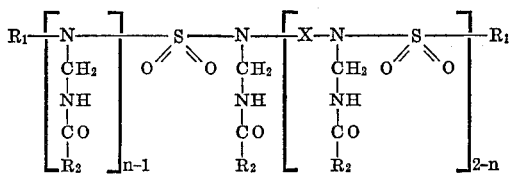

where $n$ is a whole number of at most 2, $R_1$ represents a member selected from the group consisting of an alkyl, aryl, alkaryl and aralkyl radical, and a hydrogen atom if $n=2$; $R_2$ stands for an ethylenically unsaturated radical containing up to 3 carbon atoms, and X represents a member selected from the group consisting of an alkylene and an arylene radical, and from
(b) other copolymerizable, ethylenically unsaturated monomeric compounds.

2. New addition polymerization products according to claim 1 from amides containing sulphonamide groups of $\alpha,\beta$-ethylenically unsaturated, aliphatic carboxylic acids of the formula

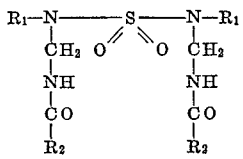

where $R_1$ represents a member selected from the group consisting of an alkyl, alkaryl, aralkyl radical and a hydrogen atom, and $R_2$ stands for an ethylenically unsaturated residue containing up to 3 carbon atoms.

3. New addition polymerization products according to claim 1 from amides containing sulphonamide groups of $\alpha,\beta$-ethylenically unsaturated, aliphatic carboxylic acids of the formula

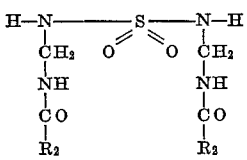

where $R_2$ represents an ethylenically unsaturated radical containing up to 3 carbon atoms.

4. New addition polymerization products according to claim 1 from amides containing sulphonamide groups of $\alpha,\beta$-ethylenically unsaturated, aliphatic carboxylic acids of the formula

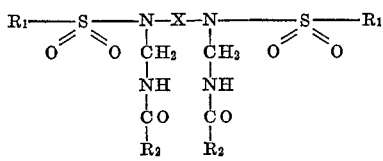

where $R_1$ represents a member selected from the group consisting of an alkyl, aryl, alkaryl and aralkyl radical, $R_2$ stands for an ethylenically unsaturated radical containing up to 3 carbon atoms, and X represents a member selected from the group consisting of an alkylene and arylene radicals.

5. New addition polymerization products according to claim 1 from amides containing sulphonamide groups of $\alpha,\beta$-ethylenically unsaturated, aliphatic carboxylic acids of the formula

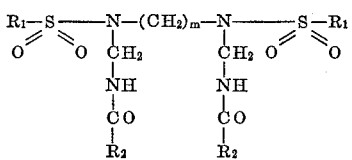

where $R_1$ represents a member selected from the group consisting of an alkyl and benzene radical, $R_2$ stands for an ethylenically unsaturated radical containing up to 3 carbon atoms, and $m$ is a whole number from 1 to 8.

6. New addition polymerization products according to claim 1 from amides containing sulphonamide groups of $\alpha,\beta$-ethylenically unsaturated, aliphatic carboxylic acids of the formula

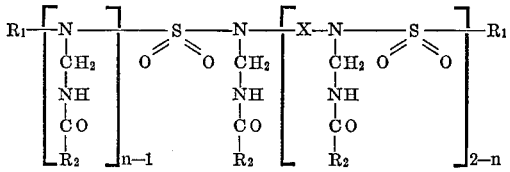

where $n$ is a whole number of at most 2, $R_1$ represents a member selected from the group consisting of an alkyl, aryl, alkaryl and aralkyl radical, and a hydrogen atom if $n=2$ and $R_2$ stands for an $H_2C=CH-$ radical.

7. New addition polymerization products according to claim 1 from
(a) amides, containing sulphonamide groups, of $\alpha,\beta$-ethylenically unsaturated, aliphatic carboxylic acids of the formula

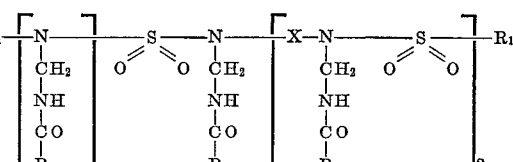

where $n$ is a whole number of at most 2, $R_1$ represents a member selected from the group consisting of an alkyl, aryl, alkaryl and aralkyl radical, and a hydrogen atom if $n=2$; $R_2$ stands for an ethylenically unsaturated radical containing up to 3 carbon atoms, and X represents a member selected from the group consisting of an alkylene and an arylene radical, and from
(b) other copolymerizable compounds selected from the group consisting of acrylonitrile, isobutylacrylate, n-butylacrylate, ethylacrylate, methylacrylate, acrylic acid, methacrylic acid, vinyl acetate, vinylidene chloride styrene and diethylaminopropylacrylamide.

8. New addition polymerization products according to claim 1 from
(a) a compound of the formula

$CH_2=CHCONHCH_2NHSO_2NHCH_2NHCOCH=CH_2$ and
(b) isobutylacrylate and acrylonitrile.

9. New addition polymerization products according to claim 1 from
(a) a compound of the formula

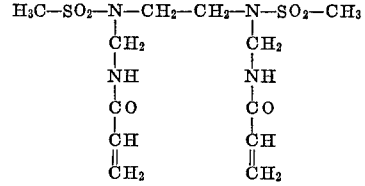

and
(b) vinylidenechloride and methylacrylate.

10. New addition polymerization products according to claim 1 from
(a) a compound of the formula
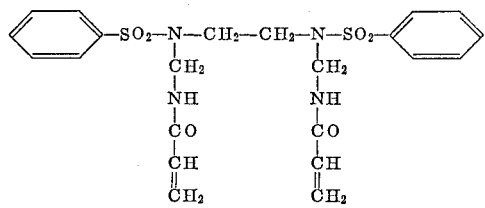
and
(b) styrene and n-butylacrylate.
References Cited
UNITED STATES PATENTS
3,322,728  5/1967  Hill _____ 260—79.3
JOSEPH L. SCHOFER, *Primary Examiner.*
D. K. DENENBERG, *Assistant Examiner.*